Figure 1:
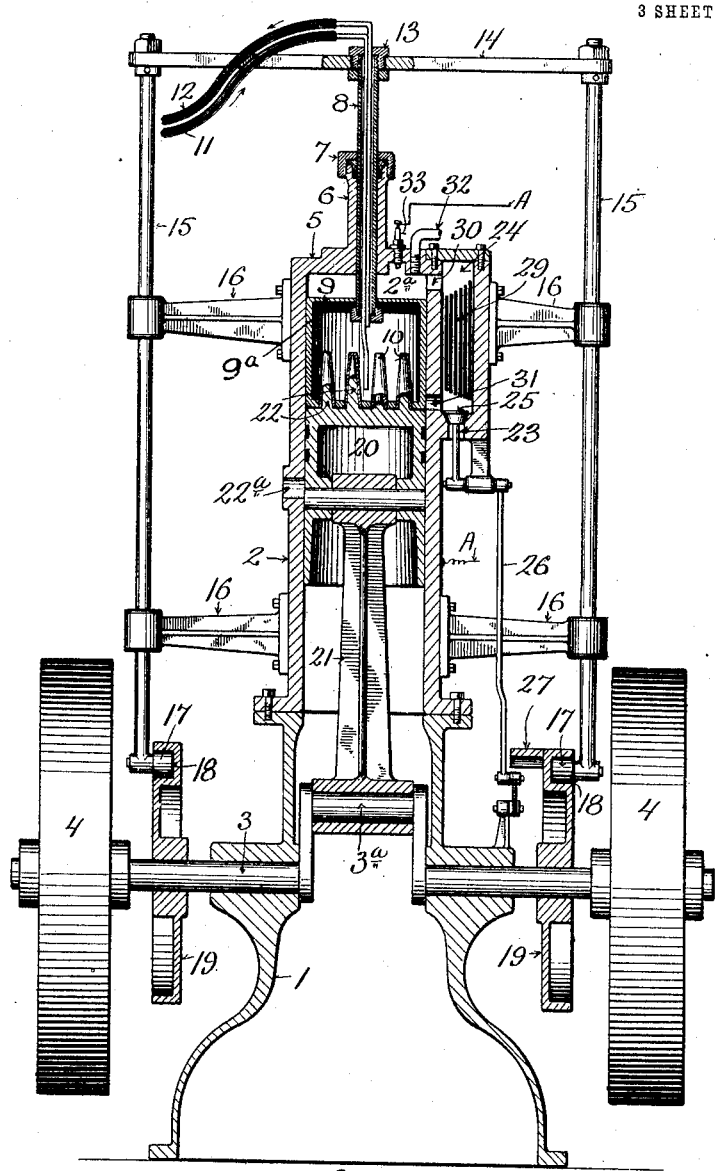

J. KOENIG.
INTERNAL COMBUSTION ENGINE.
APPLICATION FILED DEC. 20, 1910.
1,111,840.
Patented Sept. 29, 1914.
3 SHEETS—SHEET 2.
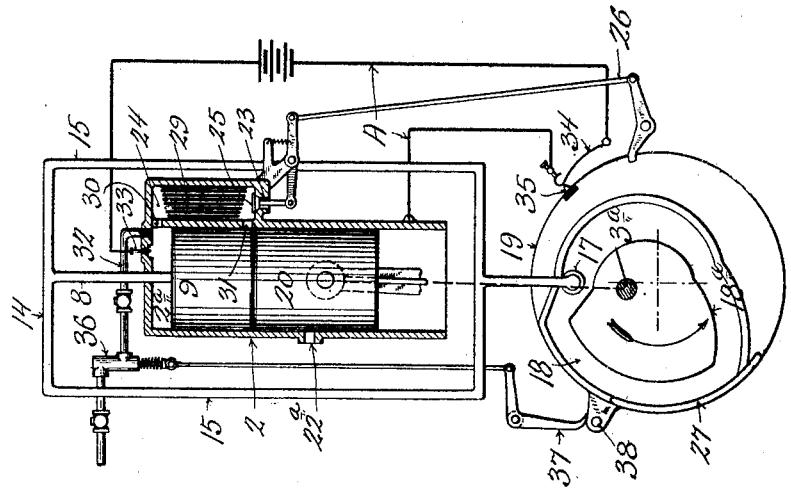
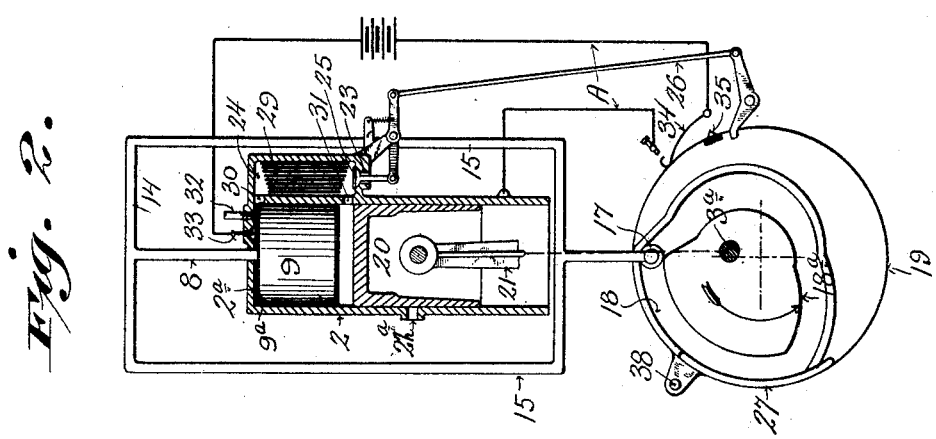

J. KOENIG.
INTERNAL COMBUSTION ENGINE.
APPLICATION FILED DEC. 20, 1910.
1,111,840.
Patented Sept. 29, 1914.
3 SHEETS—SHEET 3.
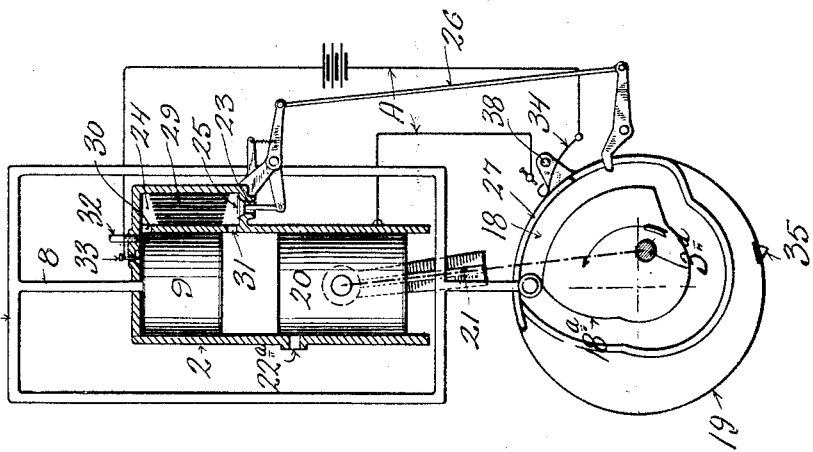
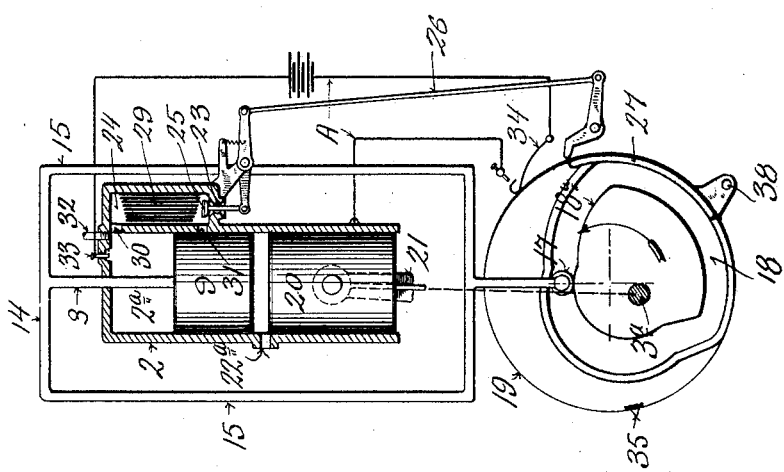

UNITED STATES PATENT OFFICE.

JOSEPH KOENIG, OF TWO RIVERS, WISCONSIN.

INTERNAL-COMBUSTION ENGINE.

1,111,840. Specification of Letters Patent. Patented Sept. 29, 1914.

Application filed December 20, 1910. Serial No. 598,447.

*To all whom it may concern:*

Be it known that I, JOSEPH KOENIG, a citizen of the United States, and resident of Two Rivers, in the county of Manitowoc and State of Wisconsin, have invented certain new and useful Improvements in Internal-Combustion Engines; and I do hereby declare that the following is a full, clear, and exact description thereof.

My invention refers to internal combustion engines of the compression type, its object being to provide simple, economical and efficient two-cycle engines of this general character, whereby a material reduction of fuel consumption in proportion to its developed H. P. will result.

The above object is obtained primarily by employing a cylinder, the exhaust chamber of which is provided with a series of thermal bodies, over which alternate charges of cold compressed air and hot spent gases are passed, whereby each charge of air is heated. This is accomplished by the up and down stroke of independently actuated tandem pistons reciprocatively mounted within the cylinder, which pistons are so timed with relation to each other that a cold volume of air is admitted therebetween through a cylinder port and compressed, the oppositely disposed compression faces of the pistons being maintained at a low temperature through the medium of a cooling system. Thus maximum compression of the cold air is obtained with the least expenditure of power, due to the fact that the surrounding cooled surfaces are separated from the hot explosion chamber of the cylinder and thus permit a large volume of air to enter the pocket therebetween. This arrangement also tends to prevent expansion of the charge by heat that would otherwise attain and offer a resisting force. The charge of cold air is thereafter compressed by the main piston and expelled into the exhaust chamber by a downward movement of the upper auxiliary piston, which movement closes up the gap between the pair of pistons and incidentally admits the displaced air charge, that is now heated to the desired temperature, above the same and into the explosion chamber of the cylinder. In shifting from between the pistons, the charge of cold air in its travel, by a system of ports travels through the exhaust chamber and over the series of thermal bodies carried thereby to the top face of the auxiliary piston whereby said charge is heated to the proper degree by absorbing a large percentage of heat stored in said thermal bodies, by absorption of the same from the spent gases of a previous explosion, incidental to exhaust. The heated charge of air over the auxiliary piston is next subjected to a jet of oil or gas and exploded in the usual manner, the explosive force being applied to the working stroke of the engine crank-shaft through the auxiliary and main pistons, which are forced downward, it being understood that the main piston is directly connected to said crank-shaft. At the end of the downward or working stroke, the auxiliary piston is then quickly returned by positive mechanism and expels the hot spent gases that fill the upper portion of the cylinder, through the exhaust and over its series of thermal bodies, whereby the same are charged with heat that is stored preparatory to receiving the next cold air charge, and thus the engine completes its cycle movement.

With the above objects in view, my invention consists in certain peculiarities of construction and combination of parts as set forth hereinafter with reference to the accompanying illustrations and subsequently claimed.

In the drawings Figure 1 represents a sectional elevation of an engine embodying the features of my invention, and Figs. 2, 3, 4 and 5, diagram views of the same illustrating the relative position of the parts assumed incidental to a complete cycle of the engine.

Referring by characters to the drawings, 1 represents an engine bed, 2 an open end cylinder that is bolted thereto, and 3 a crank-shaft, which crank-shaft is journaled in bearings that are provided in the engine-bed, the crank-shaft being equipped with the usual fly-wheels or pulleys 4.

The head 5 of the cylinder is provided with a sleeve extension 6 and gland 7 for the reception of a hollow piston-rod 8, the sleeve being of sufficient length to remove the gland portion, which constitutes a bearing for the piston, from undue contractive and expansive force of heat generated in the explosion chamber of said cylinder. The inner end of the hollow piston-rod carries an auxiliary hollow piston 9, the bottom face of which is provided with a series of inwardly extending thimbles 10 for the purpose of increasing the cooled surface area of said piston bottom. The piston, in this instance, is shown as being provided with fluid inlet and return pipes 11, 12, that pass therethrough, the outer end of which piston rod is closed by a suitable cap 13, said pipes being in flexible connection with a source of fluid supply constituting the cooling medium. By this arrangement air, water or other fluid is circulated through the hollow piston, whereby the lower head of the same is kept at a low temperature, while the upper head is kept hot by means of a non-conducting washer 9a that insulates this portion form the remainder.

While I have shown no provision for cooling the cylinder, it should be understood that the same, if desired, may be cooled by any well known method now in use.

The piston-rod 9 is secured at its upper end to a cross-head 14, which cross-head, in turn, is connected to plunger-rods 15 that are suitably guided in brackets 16 extending from the cylinder. The lower ends of the plunger-rods carry anti-friction rollers 17, that engage tracks 18 of cam-wheels 19, the same being rigidly mounted upon the engine crank-shaft. The cylinder 2 also carries a main piston 20 that is disposed directly under the auxiliary piston as shown, being connected to the crank-pin 3a of the engine crank-shaft by a pitman 21. The main piston is of the usual shell construction with the exception that, in this instance, its head is provided with a series of spurs 22 that are adapted to nest within the thimbles 10 of the auxiliary piston, whereby complete displacement of air between said pistons is practically effected, the spurs serving also as cooling mediums for the main piston head, presenting extra surface area to the cooled auxiliary piston, it being understood that, while I have shown the spurs as an integral part of the piston, the same may be separable if desired, such details of construction forming no part of my invention.

The cylinder is provided with an air intake port 22a and an exhaust chamber 24 having an exhaust port 23, which is controlled by a valve 25, the valve being operated by a valve-gear 26 under control of a cam-lug 27 that is shown as an extension of the cam-wheel 19. The exhaust chamber 24 carries a series of thermal bodies in the form of plates 29, which plates are spaced apart to permit air to circulate therebetween, there being an upper port 30 in the cylinder that communicates with the explosion chamber 2a of the same, and a lower port 31 that communicates with said cylinder and exhaust chamber at an intermediate point, the port 31 serving to admit cold air from the aforesaid cylinder to its exhaust chamber, from whence it is discharged through the upper port 30 into the explosion chamber, above the auxiliary piston, port 30 also serving to permit the return of exploded gases to the exhaust chamber from said cylinder in the manner to be hereinafter more specifically described.

The cylinder head 5 is tapped by an oil or gas feed-pipe 32 and also a spark-plug 33, which spark-plug, as best shown in the diagram views, is placed in an open battery circuit A that is closed at the proper time by a make and break spring 34, the make and break spring being engaged by a contact point 35 that is carried by the cam-wheel 19.

The means just described for producing the necessary spark, forms no part of my invention and any suitable time-controlled spark mechanism may be substituted therefor.

The oil or gas feed-pipe 32, as shown in the diagram view Fig. 3, is connected to the explosion chamber 2a of the cylinder under check-valve control, between which check-valves there is interposed a pump 36, the pump being linked to one arm of a bell-crank lever 37, which lever is operated by a pin 38 carried by the cam-wheel 19, whereby gaseous fluid is admitted to said explosion chamber at the proper time. This means for admitting gas or oil to the explosion chamber of the cylinder also forms no part of my invention as any well known mechanism for effecting this result can be substituted for that shown in the diagram. It should also be understood that, while I have shown and described my invention as being applied to a single cylinder engine, the same is intended to be used as well in connection with engines having multiple cylinders and, when so used, the results will be proportionately efficient.

Referring to the diagram view Fig. 2, the crank-pin 3a of the engine-shaft is a slight distance rearward of its highest point and traveling in the direction indicated by the arrow upon the cam-wheel 19, and the roller 17 of the plunger-rod, which controls the auxiliary piston, is at its highest point within the cam-track. In this position the auxiliary and main pistons are spaced apart and a charge of cold air is compressed therebetween, a portion of which charge fills the exhaust chamber through port 31, the charge being confined in this position owing to the fact that there is practically no further upward movement of the main piston, while the upper face of the auxiliary piston is closed against the cylinder head, cutting off communication between the explosion chamber 2a and port 30 that communicates with the exhaust chamber. An approximate one-sixteenth movement of the cam-wheel will now cause the bottom face of the auxiliary piston to move down and engage the upper face of the main piston. This downward movement of the auxiliary piston will have no effect upon the main piston due to the relative position of the cam-wheel and the crank-pin 3ª which controls the same. Incidental to the downward movement of the auxiliary piston, port 30 is opened and the compressed air charge is heated to the desired temperature by passing between the thermal plates 29, and is then admitted to the explosion chamber 2ª. The pistons will now assume the positions shown in Fig. 3 and, just prior to the completion of the movement before mentioned, pin 38 carried by the cam-wheel engaged the bell-crank 37, and the same through its connections, causes the pump 36 to inject a small charge of gas or oil into the explosion chamber containing the compressed charge of air. The contact point 35 carried by the cam-wheel will close the battery circuit A incidental to the completion of the downward movement of the auxiliary piston just described, causing the air and gas mixture to be exploded. The explosive force of the exploded charge will be exerted upon the auxiliary piston and through it to the main piston that is directly connected to the engine crank-shaft, whereby the working stroke of said crank-shaft is effected and at the completion of said stroke the pistons will assume the position as shown in Fig. 4.

Just before the main piston completes its working stroke, the engaging faces of the two pistons are separated, due to the fact that the auxiliary piston started on its downward stroke prior to movement of the main piston, which piston now travels the last fraction of its movement, advancing under momentum to the position shown in Fig. 4, in which position the air intake port is opened, whereby a fresh charge of cold air is admitted between the opposite faces of the pair of pistons. At approximately the same time that the pistons assume the position illustrated in Fig. 4, the cam-lug 27 will actuate the exhaust valve 25 through its valve-gear connections, whereby the exhaust port is opened.

In approximately the next quarter of a revolution of the cam-wheel and crank-shaft, the pistons will assume the position shown in Fig. 5. Upon starting this quarter revolution the plunger-rod roller 17 is instantly acted upon by an inclined stretch 18ª of the cam-wheel, causing the auxiliary piston to start upward while the crank-pin, which controls the main piston, is traveling across its lowest point and consequently will impart practically no movement to said main piston. Hence the auxiliary piston will have practically completed half of its upward stroke before the main piston starts to follow the same. The exhaust port being open, the spent gases will be expelled by movement of the auxiliary piston through port 30 to the exhaust chamber and out through the exhaust port 23. The spent gases at high temperature thus passing over and between the thermal plates, will cause the latter to absorb a large percentage of the heat. The auxiliary piston for approximately three-quarters of its upward movement will cut off port 31 of the exhaust chamber and hence the cold air charge between the pistons cannot escape through said port during this three-quarter travel of said auxiliary piston.

Incidental to opening of the port 31 by the auxiliary piston, cam-lug 27 permits the exhaust valve to close and hence, as the main piston travels upward, the charge of cold air between the two pistons cannot escape through the exhaust. Before the auxiliary piston has completed its upward movement, the main piston also starts upon its upward compression stroke, as stated previously, before the auxiliary piston comes to its seat against the piston head, the main piston has cut off the air intake port 22 and completed approximately a part of its upward movement, assuming the position shown in Fig. 5 with relation to the auxiliary piston, the cold charge of air being partly expelled through the port 31 into the exhaust chamber. Thus it will be seen that, in completing the cycle from the position shown in Fig. 5, there will be no further movement of the auxiliary piston while the main piston will travel up and compress the charge of cold air as previously stated, said piston, at the end of its stroke, assuming the starting position shown in Fig. 2. Thus it will be seen that, upon a single revolution of the engine crank-shaft cold air is admitted to the cylinder, compressed, heated to the desired temperature, admitted to the explosion chamber above the auxiliary piston, fired and expelled, it being observed that the surfaces of the pistons which are utilized as compressors for the cold air charge are maintained at a low temperature by the cooling medium, these surfaces at all times being isolated from the hot explosion chamber of the cylinder. In this instance I have shown and described the ports 30 and 31, of the exhaust chamber as being opened and closed by movement of the auxiliary piston, and the air intake port 22, in a similar manner, is illustrated as being opened and closed by movement of the main piston, by which arrangement the mechanism is considerably simplified, due to the fact that valves for these various ports are dispensed with, the pistons, in this instance, constituting valve-closures as a substitute for independent valve mechanisms and, while this structure, in some instances, is preferable, it should be understood that it is within the scope of my invention to employ independent valves in some instances for controlling the various ports, in which case said valves would be opened and closed by time-controlled mechanism coöperative with the movements of the pistons.

Attention is called to the fact that when the cold compression faces of the pistons close together to expel the charge, a thin film of compressed air will remain therebetween in the form of a cushion, the force of which cushion tends to spread the pistons apart when the auxiliary piston reaches the end of its downward stroke and should there be any tendency of this confined cushion of air to force the auxiliary piston backward after the pressure of the exploded charge has been expended, the undue strain upon the cam and plunger rod connection with said auxiliary piston will be equalized by a slight yield due to resiliency of the cross-head 14, in some instances. The auxiliary piston may have sufficient play relative to the walls of the cylinder to permit leakage, whereby this confined cushion of air may be equalized, by venting the same to the explosion chamber of said cylinder. However, the expansive force of the cushion of air between the pistons may be compensated for by allowing sufficient play between the grooved walls of the cam wheel with relation to the cam roller 17, the mechanical construction for obtaining this feature being immaterial to the invention.

It should be understood that, while I have shown and described the exhaust chamber 24 as being an integral part of the cylinder, the said chamber may be, in some instances, in the form of a tube or jacket constituting a passage in pipe connection with the ports 30 and 31, the exhaust port being under valve-control in said pipe connection, while the chamber or passage may or may not be equipped with thermal bodies, such features being within the scope of my invention, which invention is shown in a simple form in order that complicated details may not confuse the essential elements necessary in carrying out said invention.

I claim:

1. An internal combustion engine comprising a reciprocative piston, a cylinder therefor having an inlet port alternately opened and closed in coöperation with the movement of the piston, an auxiliary piston interposed between the head end of the cylinder and main piston, a valve-controlled exhaust chamber having separate ports communicating with the cylinder under control of the auxiliary piston, and ignition means in communication with the head end of said cylinder.

2. An internal combustion engine comprising a reciprocative piston, a cylinder therefor having an inlet port alternately opened and closed in coöperation with the movement of the piston, a second piston interposed between the head end of the cylinder and the first named piston, a valve-controlled exhaust chamber having separate ports communicating with said cylinder under control of the second piston, thermal bodies in connection with the exhaust chamber, and ignition means communicating with the head end of said cylinder.

3. An internal combustion engine comprising a reciprocative piston, a cylinder therefor having an inlet port alternately opened and closed in coöperation with movement of the piston, a second piston interposed between the head end of the cylinder and the first named piston, a valve-controlled exhaust chamber having separate ports communicating with said cylinder under control of the second piston, thermal bodies in connection with the exhaust chamber, ignition means in communication with the head end of said cylinder, and an oil or gas feed pipe communicating with the cylinder.

4. An internal combustion engine comprising a reciprocative piston, a cylinder therefor having an inlet port alternately opened and closed in coöperation with movement of the piston, a fluid-cooled hollow piston interposed between the head end of the cylinder and main piston, a valve-controlled exhaust chamber having separate ports communicating with the cylinder under control of the hollow piston, and ignition means in communication with the head end of said cylinder.

5. An internal combustion engine comprising a reciprocative piston, a cylinder therefor having an inlet port alternately opened and closed in coöperation with movement of the piston, a hollow piston interposed between the head end of the cylinder and main piston, a hollow piston-rod connected to the hollow piston, fluid pipes communicating with the hollow piston-rod, a valve-controlled exhaust chamber having separate ports communicating with the cylinder under control of the hollow piston, thermal plates in connection with the exhaust chamber, ignition means in communication with the head end of the cylinder, an oil or gas feed pipe in communication with the head end of said cylinder, a crank-shaft, and independent operating means connecting the crank-shaft and pair of pistons.

6. An internal combustion engine comprising a cylinder having an air inlet port, a piston mounted in the cylinder for controlling the air inlet port, a valve-controlled exhaust chamber having ports, one of which communicates with the head end of the cylinder and the other communicates with the cylinder at a point intermediate of its length, thermal plates carried by the exhaust chamber intermediate of its ports, a second piston mounted in said cylinder for controlling said exhaust ports, and a spark mechanism in communication with said head end of the cylinder.

7. An internal combustion engine comprising a cylinder, an exhaust chamber having a port communicating with the head end of the cylinder and a second port communicating with the cylinder intermediate of its length, thermal plates carried by the exhaust chamber intermediate of the aforesaid ports, a fluid-cooled hollow piston mounted in the head end of the cylinder for controlling said chamber ports, a crankshaft, a cam in rotative relation with the crank-shaft, means connecting the cam and hollow piston, a valve-controlled exhaust port for the exhaust chamber, means controlled by movement of the crank-shaft for operating the exhaust port valve, a second piston reciprocatively mounted within the aforesaid cylinder below the first named piston, a pitman connecting the last named piston and crank-shaft, means for admitting air to the aforesaid cylinder under control of the last named piston, ignition means in communication with the head end of the cylinder, and means for feeding oil or gas to said head end of the aforesaid cylinder.

8. An internal combustion engine comprising a cylinder having a pair of independent relatively actuated pistons therein, a valve-controlled exhaust chamber having a pair of ports one of which communicates with the head end of the cylinder, the other communicating with the cylinder at an intermediate point, thermal bodies mounted in the exhaust chamber, a crankshaft in pitman connection with one of the pistons, a cam carried by the crank-shaft in connection with the opposite piston, means for admitting air to the cylinder between the opposite pistons, means for admitting gas or oil to the head end of the cylinder, and other means for effecting ignition of the gas or oil at the head end of said cylinder.

9. An internal combustion engine comprising a cylinder having a pair of independent pistons therein, means for admitting air between the pistons, an exhaust chamber having an upper port in communication with the explosion end of the cylinder, and a lower port in communication with said cylinder intermediate of its length, timed actuating means for the pistons whereby the air therebetween is expelled through the exhaust chamber and over the head of one of the pistons, means for admitting gas to the shifted air, spark mechanism in communication with the shifted charge of air, a valve-controlled port in the exhaust chamber for releasing spent gases from the exhaust chamber, and thermal bodies carried by the exhaust chamber over which the air and spent gases are adapted to travel successively.

10. An internal combustion engine comprising a cylinder, a hollow fluid-cooled piston mounted in the cylinder, thimbles projecting into the hollow piston from one of its faces, a second piston mounted in the cylinder opposite the thimbled face of the first named piston, and spurs extending from the head of the last named piston, the spurs being adapted to enter the thimbles of the first named piston incidental to engagement of the opposite faces of the pair of pistons.

11. An internal combustion engine comprising a cylinder having an exhaust chamber, an air inlet port, and a pair of ports communicating with the exhaust chamber, tandem pistons mounted in the cylinder, a shaft provided with actuating mechanism for the pistons, whereby the same are separated for the reception of an air charge therebetween, drawn together for compressing and expelling the air charge through the exhaust chamber to a point above one of the pistons preparatory to an explosion of gas-laden air whereby both pistons are caused to travel downward on a power stroke and for thereafter returning the said pistons at intervals, whereby the exploded gases are expelled through the exhaust chamber and a new charge of air is admitted between the aforesaid pistons, means for injecting oil or gas into the compressed air charge, and means for igniting said mixture after the same has been shifted from the exhaust chamber to a point above one of the pistons, whereby the same is exploded to exert the force aforesaid upon both of said pistons.

12. In an internal combustion engine having a cylinder provided with fluid intake and an exhaust port and a reciprocative piston; the combination of a heat absorbing chamber in communication with the exhaust port, combustion end of the cylinder and at a point intermediate of its length, an auxiliary piston, a shaft provided with actuating means for the pistons whereby fluid is admitted from the inlet port between the pistons and thereafter expelled to the combustion end of the cylinder through the heat absorbing chamber.

13. In an internal combustion engine having a cylinder provided with a fluid intake port at its cold end, an exhaust port at its combustion end, and a reciprocative piston; the combination of a heat absorbing chamber in communication with the exhaust port, combustion end of said cylinder and at a point intermediate of its length, an auxiliary piston, a shaft provided with actuating mechanism for the pistons whereby fluid is admitted from the intake port to the cold end of the cylinder between the pistons and thereafter expelled through the heat absorbing chamber to the combustion end of said cylinder, a valve for the exhaust port, and timed actuating means carried by the shaft for the valve whereby the exhaust port is opened after an explosion.

14. In an internal combustion engine having a cylinder provided with a fluid intake port at its cold end, an exhaust port at its combustion end, and a reciprocative piston; the combination of a heat absorbing chamber in communication with the exhaust port, combustion end of said cylinder and at a point intermediate of its length, a plurality of thermal bodies disposed within the chamber, a double-headed hollow auxiliary piston and a cooling medium for that end of the piston which is in juxtaposition to the fluid intake port.

15. In an internal combustion engine having a cylinder provided with a fluid intake port at its cold end, an exhaust port at its combustion end, a reciprocative piston and an auxiliary piston mounted in the cylinder, the combination of a chamber in communication with the exhaust port of the cylinder and at a point intermediate of its ends, a shaft provided with actuating mechanisms for the pistons whereby air is compressed between the two pistons at the cold end of said cylinder and thereafter shifted through the exhaust chamber to the hot end of said cylinder incidental to explosion.

16. In an internal combustion engine having a cylinder provided with a fluid intake port at its cold end, an exhaust port at its combustion end, a port intermediate of its ends and a reciprocative piston; the combination of a chamber disposed intermediate of the ends of the cylinder and in communication with the cylinder exhaust port and its intermediate port, a plurality of thermal bodies disposed in the chamber, and a fluid cooled auxiliary piston for controlling communication between the chamber and cylinder.

17. An internal combustion engine comprising a cylinder provided with fluid inlet and an exhaust port, a chamber communicating with the exhaust port of the cylinder and at a point intermediate of its ends, thermal bodies located in the chamber, a working piston reciprocative in the cylinder, a crank-shaft in connection with the working piston, an auxiliary piston interposed between the working piston and combustion end of said cylinder, and cams carried by the crank shaft in connection with the auxiliary piston whereby timed movement of the same with relation to movement of the working piston is had.

18. In an internal combustion engine having a cylinder provided with a fluid intake port at its cold end, an exhaust port at its combustion end, a reciprocative piston and a crank-shaft in link connection therewith; the combination of a heat absorbing chamber in communication with the exhaust port of the cylinder and at a point intermediate of its length, an auxiliary piston actuating mechanism therefor under control of the crank-shaft for shifting fluid admitted to the cold end of the cylinder to its combustion end through said heat absorbing chamber, a sleeve extending from the combustion end of said cylinder, a gland fitted to the end of the sleeve at such distance from the explosion end of the aforesaid cylinder as to be comparatively slightly affected by heat, and a piston rod extending through the gland having one end secured to the auxiliary piston.

19. In an internal combustion engine having a cylinder provided with a fluid intake port at its cold end, an exhaust port at its combustion end, a reciprocative piston and a crank-shaft therefor; the combination of a chamber in communication with the exhaust port of the cylinder and at a point intermediate of its ends, heat absorbing plates within the chamber, and an auxiliary piston of predetermined length mounted in said cylinder between its combustion end and piston, actuating means for the pistons under control of the crank-shaft movement, whereby fluid is admitted through the intake port between the pistons, compressed and expelled to the explosion end of the cylinder through the chamber and thereafter expelled through the exhaust port incidental to an explosion.

20. In an internal combustion engine having a cylinder provided with a fluid intake port at its cold end, an exhaust port at its combustion end, and a reciprocative piston; the combination of a chamber in communication with the exhaust port and lower end of the cylinder and combustion end thereof, heat absorbing plates within the chamber, a double-headed auxiliary piston in the cylinder between its main piston and combustion end, means for cooling the auxiliary piston, and means for insulating the cooled end from the opposite end of said auxiliary piston.

In testimony that I claim the foregoing I have hereunto set my hand at Two Rivers, in the county of Manitowoc and State of Wisconsin in the presence of two witnesses.

JOSEPH KOENIG.

Witnesses:
REMUS KOENIG,
G. A. MAGEE.